US006951233B1

(12) United States Patent
Calvar et al.

(10) Patent No.: US 6,951,233 B1
(45) Date of Patent: Oct. 4, 2005

(54) ELECTRICALLY CONDUCTIVE TIRE AND APPARATUS AND PROCESS FOR EXTRUDING ELEMENTS WHICH HAVE BEEN MADE CONDUCTIVE

(75) Inventors: Didier Calvar, Beaumont (FR); Serge Nicolas, Clermont-Ferrand (FR); Daniel Bardy, Clermont-Ferrand (FR)

(73) Assignee: Compagnie Generale des Etablissements Michelin-Michelin & CIE, Clermont-Ferrand Cedex (FR)

( * ) Notice: Subject to any disclaimer, the term of this patent is extended or adjusted under 35 U.S.C. 154(b) by 0 days.

(21) Appl. No.: 09/645,097

(22) Filed: Aug. 24, 2000

Related U.S. Application Data

(63) Continuation of application No. PCT/EP99/01044, filed on Feb. 17, 1999.

(30) Foreign Application Priority Data

Feb. 26, 1998 (FR) ................................. 98 02462

(51) Int. Cl.[7] ........................ B29C 47/06; B29C 47/12; B29D 30/52; B60C 1/00; B60C 19/08
(52) U.S. Cl. ............................... 152/152.1; 152/209.5; 152/DIG. 2; 156/243; 156/244.11; 156/501; 264/173.1; 264/174.11; 425/131.1; 425/133.5; 425/380; 425/462
(58) Field of Search .................... 156/244.11, 500, 156/501, 110.1, 243; 264/167, 173.11, 173.12, 264/173.17, 174.11, 177.16, 105, 173.1; 425/131.1, 133.5, 462, 325, 380; 152/152.1, 152/209.5, DIG. 2

(56) References Cited

U.S. PATENT DOCUMENTS 3,099,859 A * 8/1963 Eilersen
3,565,737 A * 2/1971 Lefevre et al.
3,768,537 A * 10/1973 Hess et al.
4,478,266 A   10/1984 Pierson et al.
4,539,169 A * 9/1985 Nixon et al.
4,556,376 A * 12/1985 Sievers et al.
4,927,482 A * 5/1990 Capelle
5,017,118 A   5/1991 Looman et al.
5,227,425 A   7/1993 Rauline ..................... 524/493
5,453,238 A   9/1995 Bardy
5,937,926 A * 8/1999 Powell
5,942,069 A * 8/1999 Gerresheim et al.
6,044,882 A * 4/2000 Crawford et al.
6,202,724 B1* 3/2001 Hiruma et al.
6,269,854 B1* 8/2001 Matsuo et al.
6,294,119 B1* 9/2001 Nakamura (Continued)

FOREIGN PATENT DOCUMENTS

EP          0104133         3/1984

(Continued)

OTHER PUBLICATIONS

Patent Abstracts of Japan, vol. 012, No. 113 (M-683), Apr. 9, 1998 & JP 62 240527 A (Mitsubishi Plastics IND Ltd), Oct. 21, 1987.

(Continued)

Primary Examiner—Steven D. Maki
(74) Attorney, Agent, or Firm—E. Martin Remick

(57) ABSTRACT

A tire having a tread composed of two non-conductive layers, each layer containing a circumferential insert of conductive mix, the inserts having a wider interface at the interface of the two layers. An apparatus for extruding a layer, provided with a conductive insert, including a main extruder for extruding a non-vulcanized, non-conductive layer, and a micro-extruder having an extrusion head, provided at its end with a nozzle, for extruding a conductive insert in the layer.

13 Claims, 6 Drawing Sheets

U.S. PATENT DOCUMENTS

2001/0022410 A1 * 9/2001 Benatti

FOREIGN PATENT DOCUMENTS

| EP | 0484868 | | 5/1992 |
| EP | 0609550 | | 8/1994 |
| EP | 0658452 | | 6/1995 |
| EP | 0718127 | | 6/1996 |
| EP | 0753391 | | 1/1997 |
| FR | 2759946 | | 8/1998 |
| JP | 11-20426 | * | 1/1999 |
| WO | WO 98/38050 | * | 9/1998 |
| WO | WO 99/43506 | * | 9/1999 |

OTHER PUBLICATIONS

Patent Abstract of Japan, vol. 010, No. 167 (M-488), Jun. 13 1986 & JP 61 019330 A (Sekisui Kaselhin Kogyo KK), Jan. 28, 1986.

Derwent Abstract for French Patent No. FR2759946, Application No. FR972276.

* cited by examiner

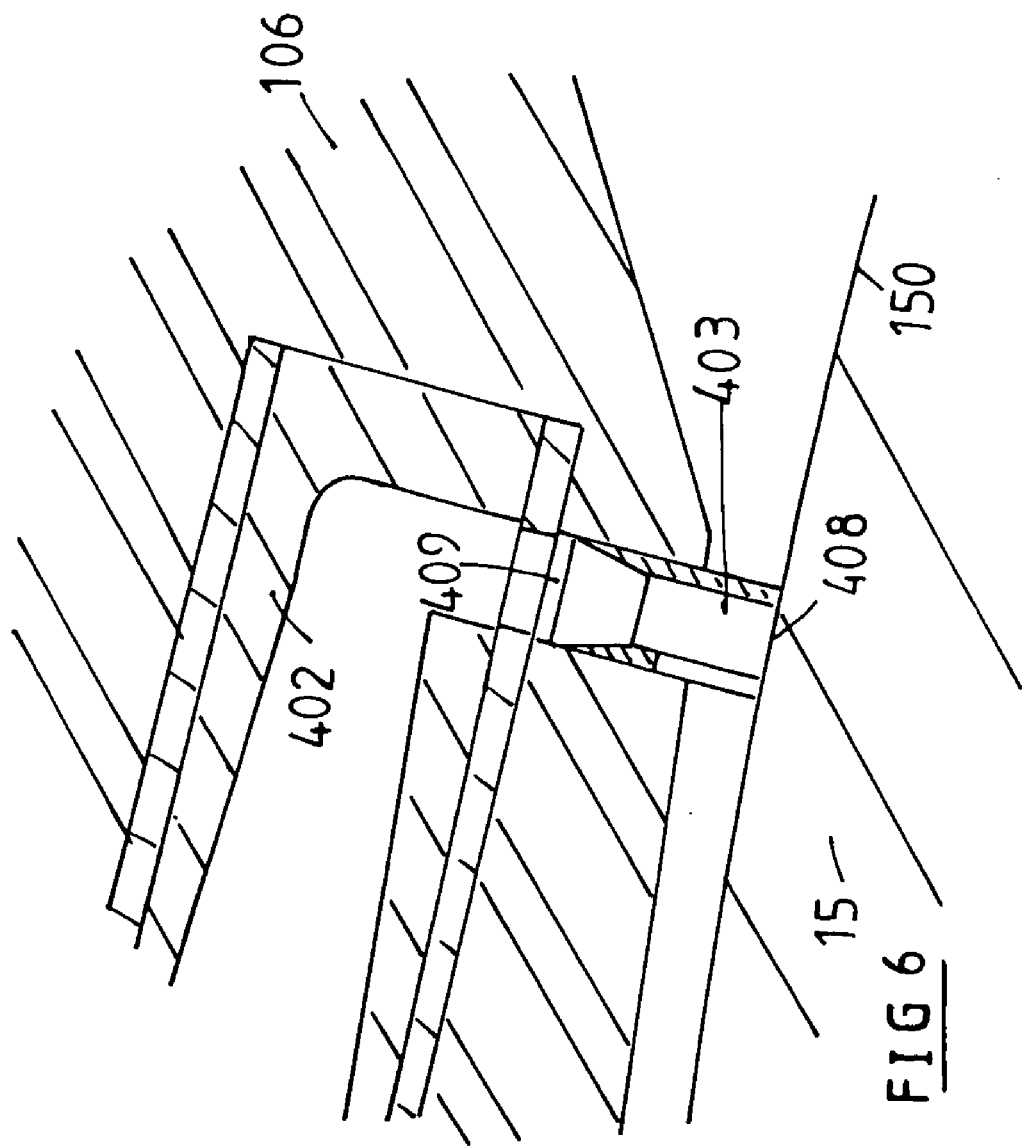

ELECTRICALLY CONDUCTIVE TIRE AND APPARATUS AND PROCESS FOR EXTRUDING ELEMENTS WHICH HAVE BEEN MADE CONDUCTIVE

This is a continuation of PCT/EP99/01044, Filed Feb. 17, 1999.

BACKGROUND OF THE INVENTION

The subject of the present invention is a tire composed of a plurality of mixes comprising as majority filler a non-conductive filler such as silica, or mixes having a low content of black filler, at least one of these mixes being the tread. It relates more particularly to a tire which may exhibit not insignificant internal temperature increases during travel, such as a tire intended, for example, to bear heavy loads. It also relates to a process for making such a tire, and an apparatus for carrying out such a process.

Since environmental problems are becoming ever more crucial, and savings in terms of fuel and the fight against the pollution produced by motor vehicles have become a priority, one of the aims of tire manufacturers is to produce a tire having all of the following: very low rolling resistance, excellent adhesion both on dry ground and on wet or snow-covered or icy ground, very good wear resistance, and finally reduced running noise.

To achieve this aim, a tire having a tread comprising silica as main reinforcing filler was proposed in European Patent Application No. EP A 501 227. Although this solution makes it possible to obtain the best compromise between all the very contradictory properties mentioned above, it has however proved that, depending on the vehicles, tires using a tread comprising silica as main reinforcing filler have the disadvantage of accumulating static electricity to a greater or lesser extent, this being formed by friction of the tire on the road during travel of the vehicle due to the lack of electrical conductivity of the silica.

The static electricity thus built up in a tire, when certain specific conditions are combined, is capable of giving the occupant of a vehicle an unpleasant electric shock when he has cause to touch the body of the vehicle. It is furthermore capable of accelerating ageing of the tire due to the ozone generated by the electrical discharge. It may also be the cause, depending on the type of ground and the vehicle, of poor operation of the onboard radio owing to the interference which it produces.

This problem of buildup of static electricity in a tire and of the majority of the disadvantages linked thereto is a very old one, and occurred even in the days when the reinforcing filler used was carbon black.

Application No. EP 0 658 452 A1 describes the adaptation of principles which have been known for a long time to a so-called "modern" tire, which adaptation makes it possible to solve the main problems pertaining to the solutions proposed in various older documents and, in particular, the harmful heterogeneity introduced into tire structures. The solution proposed consists in inserting a strip of conductive rubber mix or insert, extending preferably over the entire circumference of the tire and connecting the surface of the tread either to one of the crown plies, or to the carcass reinforcement, or to any other part of the tire which is sufficiently electrically conductive, the necessary electrical conductivity being imparted by the presence of a suitable carbon black.

U.S. Pat. No. 5,017,118 describes a co-extrusion apparatus comprising a single extruder which has a plurality of flow channels which open respectively on to an orifice formed by extrusion blades. Thus, as shown in FIGS. 7 and 8 of the document, the insert 120 parallel to the mixes 114, 118 and 122 arrives via a flow channel in the orifice 94 formed by the blades 106 and 98 on the surface 116 of the roller.

Although such a solution is perfectly viable for a tire comprising a tread formed of a single non-conductive mix, for example, a tread for a passenger vehicle, the same does not apply in the case of a tire comprising a plurality of layers of rubber mixes above the crown reinforcement and layers of rubber between the crown reinforcement and the carcass reinforcement, as is the case for any tire liable to travel at a high stabilized operating temperature, such as heavy vehicles or high-speed vehicles.

In fact, if for any reason one has cause to provide such a tire with a non-conductive layer, or inner part of the tread (part not in contact with the ground), between the crown reinforcement and the outer part (part in contact with the ground) of the tread which has been rendered conductive by the presence of a circumferential insert or striping, said inner part will have to be rendered conductive. Likewise, a layer between the carcass reinforcement and the crown reinforcement, having manifest oversize in the regions of the edges of crown plies, will also have to be rendered conductive if it is not initially so.

A first solution for obtaining a conductive tread consists in coextruding the inner and outer parts of the tread, and providing the assembly thus formed with a conductive circumferential insert. Said solution is not satisfactory for several reasons; two of these may be mentioned: in the type of tire in question, the total thickness of the tread is too great; furthermore, it may be advantageous for the conductive inserts, of the inner and outer layers of the tread respectively, not to be made with the same quality of rubber mix.

Another solution, as described in French Application No. FR 97/02276 by the Applicant, consists in providing the electrical connection between two layers which are or have been rendered conductive, separated by a non-conductive layer, by at least one strip of rubber mix of low thickness, width and length, laid between the two faces of the weld of the non-conductive layer and in contact with the means which render conductive the two layers connected by the connection. Although industrially satisfactory, said method requires additional laying of product and involves additional production costs.

A third solution consists in providing each non-conductive part with a circumferential insert having a circular rectilinear trace or circular striping after extrusion of said part by conventional extrusion means, and then joining the two products together before laying them on the crown reinforcement. To the extent that the striping is generally very fine in order not to upset the physical properties of the compositions constituting the two parts of the tread, the thickness of these inserts, on the tire viewed in cross-section, being of the order of 0.01 to 2.0 mm, such a solution requires the trace of the striping of the outer part of the tread on the contact wall between the two parts to be perfectly aligned with or centered on the trace on said wall of the striping of the inner part of the same tread.

Furthermore, the mechanical properties of the rubber compositions before vulcanizations are very poor, and the uncured rubber mix may be in the form of an extremely soft paste, or conversely an extremely hard agglomerate. Whatever the manner of working such mixes, it is difficult perfectly to control the geometry of the semi-finished product, the assembly of the two non-vulcanized parts of the tread: the concordance and alignment between the respective traces of the two sets of striping on the contact wall between the two parts cause great development difficulties, the solution of two sets of circular striping being unable to be considered as structurally optimized and industrially viable, both from the point of view of cost and of the performance obtained.

Thus although one of the aims of the invention is, in a tire having a plurality of non-electrically conductive mixes, to dissipate the electrostatic charges induced by the travel of the tire, without significantly affecting the level of the properties of the tire, the other aim is to be able to obtain a tire as simply as possible and at lower cost, be these material costs and/or manufacturing costs.

SUMMARY OF THE INVENTION

In a first aspect, the invention proposes a tire comprising at least two layers of non-electrically conductive rubber mixes, said two layers having a common contact wall, characterized in that each layer contains a circumferential insert of conductive mix, having a circular rectilinear trace, the insert of at least one first layer having, when viewed in cross-section, a surface S having two bases, a first base, on the contact wall between the two layers, having a width equal to at least 10 times the width of the first base on said contact surface of the surface S' of the insert of the second layer, said first bases being on the common contact wall facing each other, and the central axes of the two bases which face each other being parallel to and distant from the equatorial plane of the tire by amounts, the difference between which is at most equal to half the width of the first base of the first layer, such that there is circumferentially between the two traces on the common contact wall a plurality of contact points providing the electrical connection between two conductive elements.

In the very great majority of cases, the two non-conductive layers will be the inner and outer parts of the tread, and the electrical connection must be ensured between the ground and the crown reinforcement, which is composed of calendered metal cables in a rubber mix which has been rendered conductive by the presence of carbon black in its composition. The non-conductive layers may also be, firstly, the axially outer part of the profiled element of triangular transverse shape separating the carcass reinforcement and an edge of the crown reinforcement, and secondly the inner and outer parts of the tread, the connection needing to be ensured between the three layers.

Preferably, and in the case of a tread, one of the parts of said tread, and more particularly the outer part of the tread, will be provided with an insert having a transverse surface having two bases of different widths, the first base having a width very much greater than the width of the second base which is located on the surface of the tread, whereas the other part, preferably the inner part of the tread, will be provided with striping, the transverse surface of which is rectangular, the two bases of said surface being equal.

The transverse surface of the insert comprising two bases of different widths may be of several forms. Advantageously, and so as to have the least possible amount of conductive material, in particular in the tread layers of the tire, the transverse surface of the insert of the outer tread layer will be in the shape of an upturned T, with a rectangular part of low width, and a triangular or rectangular part with a base of great width, based on the common wall of the two layers.

A layer, be it part of the tread or an intermediate profile between the carcass reinforcement and the crown reinforcement, may be obtained, for example, in the non-vulcanized state by means of extrusion in an extruder which is referred to, in known manner, as a roller die extruder, the profile or section of the extruded product being defined firstly by the surface of the roller on which the rubber mix is extruded and secondly by the fixed wall of an extrusion blade which cooperates with said surface to define an extrusion orifice. The process according to the invention, intended for obtaining an assembly of two conductive layers, for example the inner and outer parts of a tire tread, consists in:

extruding each layer separately on an extruder comprising an extrusion head provided with a flow channel which opens on to an extrusion orifice comprising a fixed wall which cooperates with a rotary roller, inserting by coextrusion into each layer, for example, each part of the tread, striping of conductive mix in the non-vulcanized state which is circumferential and has a transverse surface having two bases, by means of the nozzle of a micro-extruder, said nozzle being fixed and applied against a wall of said extrusion apparatus, for example the wall of the roller of the main extrusion apparatus, and joining the two non-vulcanized layers by the conventional means.

The coextrusion can be advantageously effected at three different points: either in the flow channel between the upper arch and the lower arch defining said channel, or between the upper arch and the wall of the rotary roller, or between the upper wall of the extrusion orifice and the wall of the roller.

The apparatus according to the invention for implementing the process for obtaining a rubber profiled element with insert or striping of cross-section having two bases, are of two types.

The apparatus of the first type comprises a main roller die extruder for extruding the rubber layer or profiled element, for example, the upper part of a non-vulcanized tread, and a micro-extruder, mounted fixed on a support and comprising mainly an extrusion head, provided at its end with a nozzle for extruding, according to the desired profile and trace, the circumferential insert in the profiled element of non-vulcanized mix emerging from the main extruder, the extrusion head and the nozzle being placed in the flow channel or accumulation chamber for the rubber to be extruded either between the upper arch and the lower arch of the main extruder, or between the upper arch and the rotary roller, the nozzle having a head, the end of which is applied against the lower arch or against the roller of the main extruder. The invention also relates to the extrusion nozzle or orifice of the micro-extruder used. Said nozzle is characterized in that it comprises an annular part for bearing on and attachment to the die of the micro-extruder with the attachment elements necessary for fixing, a hollow cylindrical feed chamber, either straight or bent, having on its cylindrical surface an extrusion orifice, through which is extruded the conductive rubber material, and which occupies substantially all the height of said nozzle, and the cross-section of which has a shape adapted to the desired section of the conductive insert: a section having two bases of different widths if an insert having two different bases is being extruded, or a section having two bases of equal widths if an insert of rectangular section is being extruded.

The apparatus of the second type likewise comprises a main extruder, having a roller die or flat die, for extruding the rubber layer or profiled element, for example, the inner part of a non-vulcanized tread, and a micro-extruder comprising mainly an extrusion head, provided at its end with a nozzle intended to extrude, according to the desired profile and trace, the circumferential insert in the profiled element of non-vulcanized rubber mix emerging from the main extruder. The invention relates more particularly to the fastening of the micro-extruder and the nozzle or extrusion orifice of the micro-extruder used. The micro-extruder, or at least part of the extrusion head thereof, is inserted and fixed in the upper part of the extrusion blade, said extrusion head being bent at its end to permit application of the nozzle against the roller or against the lower part of the extrusion blade, depending on the type of main extruder used.

Said nozzle is characterized in that it comprises an annular part for bearing on and attachment to the die of the micro-extruder with the attachment elements necessary for fixing, a hollow cylindrical feed chamber, either straight or bent, having on its cylindrical surface an extrusion orifice, through which is extruded the conductive rubber material, and which occupies substantially all the height of said nozzle, and the cross-section of which has a shape adapted to the desired section of the conductive insert: In this apparatus of the second type, the extrusion nozzle is advantageously provided with a die which is mobile in translation along an axis substantially perpendicular to the axis of the roller, and making it possible, under the action of the pressure of the conductive mix which passes through it, to manufacture products of different thicknesses, while guaranteeing, during their manufacture, a minimum distance between the end of the nozzle and the roller of the main extruder.

DESCRIPTION OF THE DRAWINGS

The characteristics of the present invention will be better understood with reference to the drawings appended to the following description, in which drawings:

FIG. 6 is an enlarged view of an extrusion nozzle which can be used on the apparatus of FIG. 5.

DESCRIPTION OF PREFERRED EMBODIMENTS

Figure 1A:
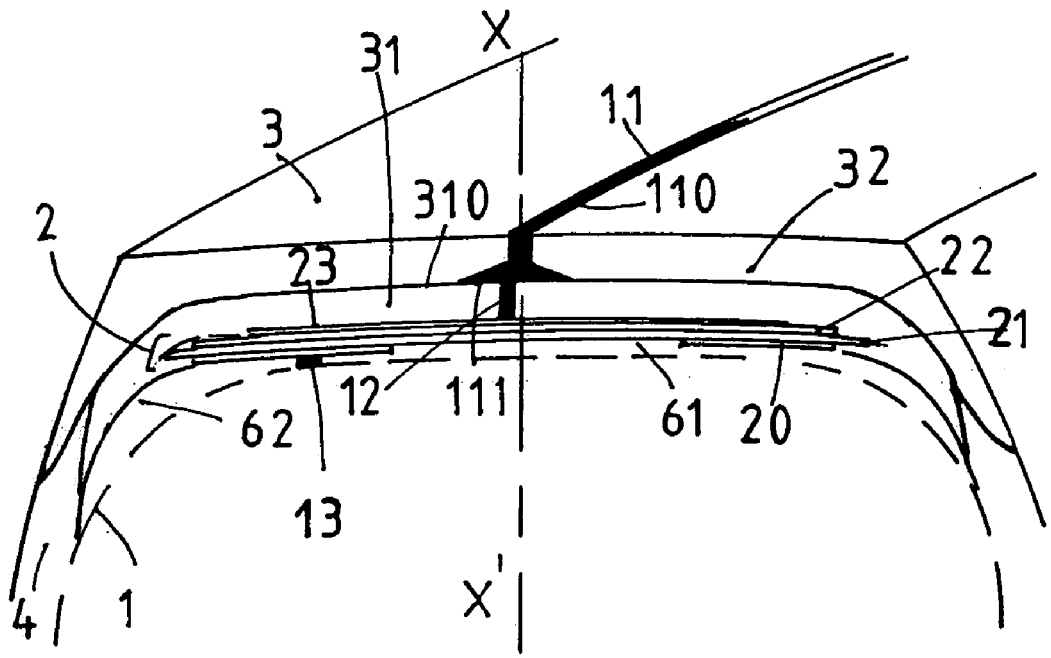
FIG. 1A shows, in perspective view, the crown part of a tire having a non-conductive tread.

The tire of dimension 315/80 R 22.5, which is designed to have a low rolling resistance, comprises a carcass reinforcement 1 composed of a metal ply formed of inextensible metal cables coated in a rubber calendering mix, which is rendered conductive of electrostatic charges by means of a carbon black commonly used as a reinforcing filler in mixes. Said carcass reinforcement 1 is, as is known, anchored to at least one bead wire within each bead to form an upturn (not shown). Within said carcass reinforcement 1 there are the conventional reinforcement layers, and the so-called inner layers formed of mixes which are generally impermeable to the known inflation gases. The end(s) of this (these) inner layer(s) is (are) generally covered by the axially inner part of the protective layer of the bead (not shown), a wear layer, the axially outer part of which bears on the mounting rim, said layer generally having a very high content of carbon black filler, and therefore being highly conductive.

The carcass reinforcement 1 is surmounted in its crown by a crown reinforcement composed, in the example described, of two so-called triangulation half-plies 20 formed of inextensible metal cables which are oriented at an angle which may be between 30° and 90° relative to the circumferential direction; then, radially above, of two so-called working plies 21 and 22 composed of inextensible metal cables crossed from one ply to the next, forming angles which may or may not be identical, and of absolute value of between 10° and 30°, with the circumferential direction; then generally, lastly of at least one so-called protective ply 23 formed of elastic cables which form with the circumferential direction an angle equal in direction and value to the angle of the radially outermost working ply. All the cables of this crown reinforcement 2 are coated in one or more rubber calendering mix(es) which are conductive of electrostatic charges due to a carbon black commonly used as reinforcing filler in the mixes.

The crown reinforcement 2, which does not have the same transverse profile as that of the subjacent carcass reinforcement 1, is separated from said carcass reinforcement 1 by a rubber assembly of low thickness on the central axial part 61, where the two reinforcements are substantially parallel and, on either side of said central part 61, of increasing thickness towards the outside of the tire in order to form wedges or triangular profiled members 62. For reasons of heating, said rubber wedges 62 and the axial part 61 are not made with conductive rubber mixes, because they have a very low carbon black filler content. Radially above the crown reinforcement 2, there is arranged the tread 3 composed of the radially inner layer 31, referred to as "underlayer", formed of a mix filled with a majority of silica, which underlayer 31 itself is surmounted radially by the radially outer layer 32, or rolling layer, having a very high silica filler content. The tread 3 is connected to the beads by the sidewall mixes 4, which also have a very high silica filler content.

Figure 1B:
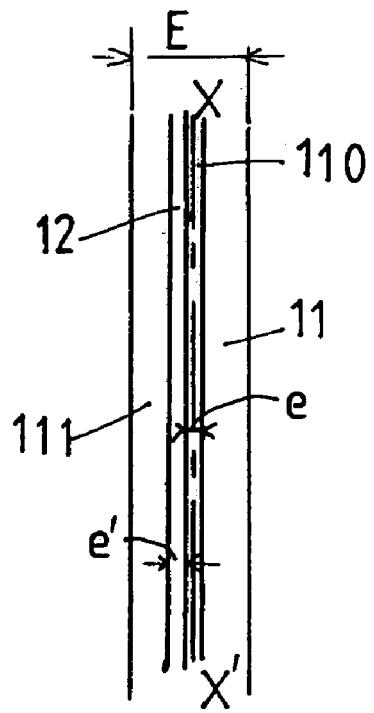
FIG. 1B is a plan view of part of the tread of said tire.

The rolling layer 32 is rendered conductive by means of the rubber insert 11, which is in the form of a circumferential ring over the entire height of the rolling layer 32 to connect the surface of the tread which comes into contact with the ground with the radially upper face 310 of the underlayer 31. This insert 11 of very low axial width e on the surface of the tread, equal to 0.5 mm, in the present case, is a single one and is centered theoretically on the equatorial plane XX' of the tire, and its trace on the contact surface 310 between the two parts 31 and 32 of the tread is rectilinear and circular. The insert 11 could be off-center, in particular in the case of the presence of a central groove on the tread; there could be two inserts 11, placed, for example, symmetrically to the equatorial plane, or more, but in any case placed axially such that the contact with the ground can be established whatever the amount of wear of the tread. This insert, when viewed in cross-section, has a surface having two bases 110 and 111, the base 110 being the base of low width e on the tread surface. As for the other base 111, on the contact surface between the two parts 31 and 32 of the tread, it is comparatively very wide since its width E is equal, in the example described, to 20 mm, that is to say, 40 times the width e, and the cross-section of the insert 11 may be considered as the radial superposition of a rectangular part of low width e and great thickness on a rectangular part of great width E and low thickness FIG. 1B. The electrical connection between the running layer 32, or more accurately between the insert(s) 11 and the radially outer ply 23 of the crown reinforcement 2, which is formed of metal cables coated in a rubber mix filled with a conventional, conductive, carbon black, is effected by means of a circumferential insert 12 over the entire height of the part 31 of the tread, and the trace of which, of width e', on the contact wall 310 between the two parts 31 and 32 of the tread 3, is also circular, the width e', in the case described, being equal to the width e. The rubber composition constituting the conductive connection 12 for the electrostatic charges, like the composition of the insert 11, is based on a natural rubber and/or synthetic rubbers, which are conventionally used in building tires and particularly treads, and having as reinforcing filler a conductive carbon black preferably conventionally used in the manufacture of tires. As shown in FIGS. 1A and 1B, said insert 12, like the insert 11, has a trace or line, on the contact surface between the two layers 31 and 32, of circular shape, the transverse surface of which is in the form of a rectangular surface of width e' and of a depth equal to the thickness of the layer 31. The inserts 11 and 12 have, on the aforementioned contact wall, circumferential surfaces such that the surface of width e' is included in the surface of width E, which is substantially larger. The arrangement thus adopted makes it possible, after positioning the two parts of the tread, be it on a tire building drum or on any other means of joining said two parts, to have between the two inserts 11 and 12 which are in contact, whatever the normally accepted errors in positioning of the two parts of the tread relative to each other, or errors of centering during manufacture (offset of the center axes of the two inserts 11 and 12 which is visible in FIGS. 1A and 1B).

The electrical connection between the crown reinforcement 2 and the carcass reinforcement 1 is effected, in the case described, by means of an insert 13 of rectangular cross-section having rectilinear and circular traces of a width e' equal to e and to 0.5 mm on the surface common with the carcass reinforcement and the surface common with the crown reinforcement, said insert 13 possibly being circumferentially continuous or discontinuous.

The insert(s) 11, 12 which conduct(s) electrostatic charges, owing to its (their) rubber composition having a high content of carbon black, may be produced by any suitable means, both at the time of building of the tire in the non-vulcanized state and after vulcanization. The conductive insert or inserts 11 may be produced, for example, by extrusion during the building of the radially upper layer 32 of the tread 3 in the non-vulcanized state. The same applies to the inserts 12 and 13 for the radially inner layer 31, which is obtained separately by extrusion, or for the layer 6.

Figure 2:
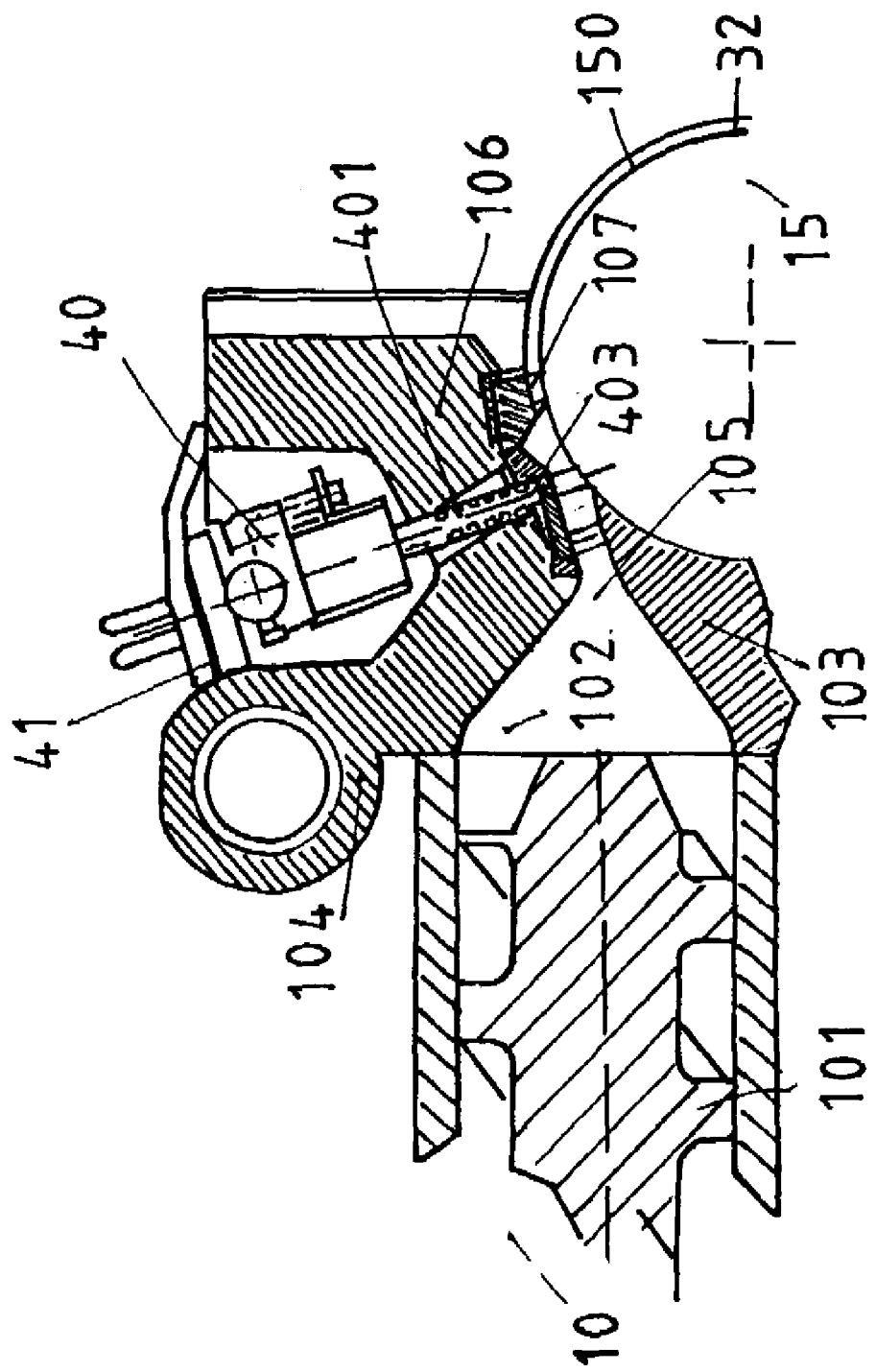
FIG. 2 shows the main components of an apparatus used according to the invention.

FIG. 2 shows a first extruder 10 which, using the extrusion screw 101, delivers the non-vulcanized rubber mix intended for the manufacture of the upper part 32 of the tread, in an extrusion head 102, defined by upper 104 and lower 103 arches, and comprising a flow channel 105 which firstly carries the mix to the rotary roller 15 which is associated with the extruder 10, and secondly carries said mix towards an extrusion orifice 107 defined by the cylindrical surface 150 of the roller 15 and the fixed wall of a blade 106, the extrusion orifice making it possible to impart the desired profile to the extruded mix. With said first extruder and roller there is associated a micro-extruder 40, mounted fixedly on a support 41. This extruder, equipped with a screw 401 and an extrusion head 402, comprises at its end a nozzle 403 fixed to the die of the micro-extruder 40, and intended, depending on the desired profiles and traces, to extrude the circumferential insert 11 in the profiled member of hot, non-vulcanized mix emerging from the orifice 107 of the extruder 10. The support 41 is such that the extrusion head 402 and the nozzle 403 of said micro-extruder are placed in the flow channel 105 of the main extruder 10, upstream of the extrusion orifice 107. The conductive rubber mix is thus extruded in the flow of non-conductive mix.

Figure 3:
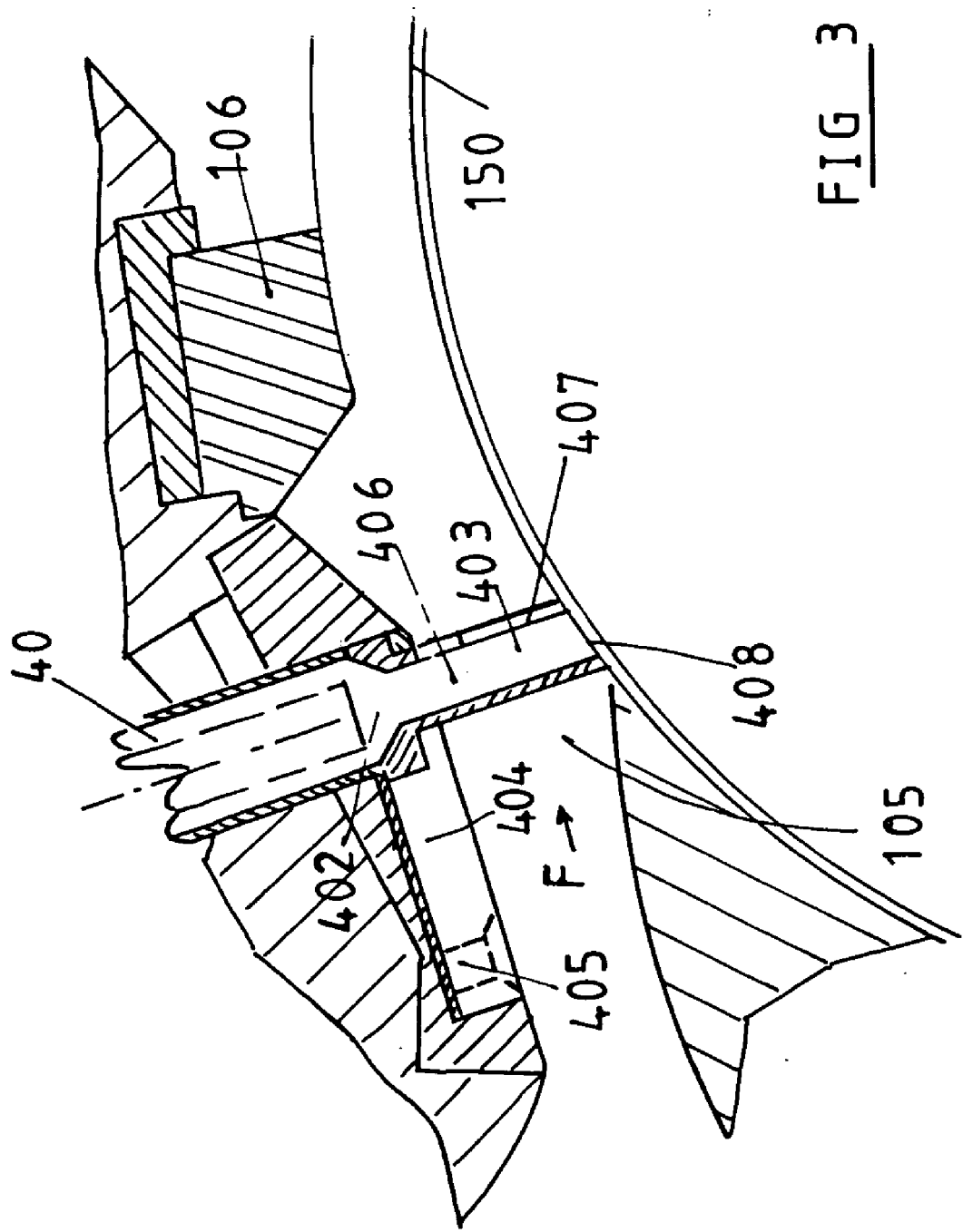
FIG. 3 is an enlarged view of the apparatus of FIG. 2.

As shown in FIG. 3, which shows an enlargement of the extrusion nozzle 403 of the micro-extruder 40 of FIG. 2, said nozzle 403 of the extrusion head 402 placed in the flow channel 105 of the main extruder 10 comprises an annular part 404 which makes it possible for the nozzle to bear on and be attached to the die of the extrusion head 402 of the micro-extruder 40, owing to the presence of a plurality of attachment holes 405. A hollow cylindrical feed chamber 406 has on its cylindrical surface an extrusion orifice 407 through which the conductive rubber material is extruded and which occupies virtually the entire height of said nozzle, and the cross-section of which is a section having two bases of different widths. The extrusion nozzle 403 is placed in the flow channel 105 such that the flow F of the rubber mix to be extruded by the main extruder 10 initially hits the side of the hollow body opposite the place where the extrusion orifice is located. Since the end 408 of the nozzle 403 is applied against the surface 150 of an extrusion roller 15 of the main extruder 10, the conductive mix to be extruded adopts precisely the shape imparted by the extrusion orifice.

Figure 4:
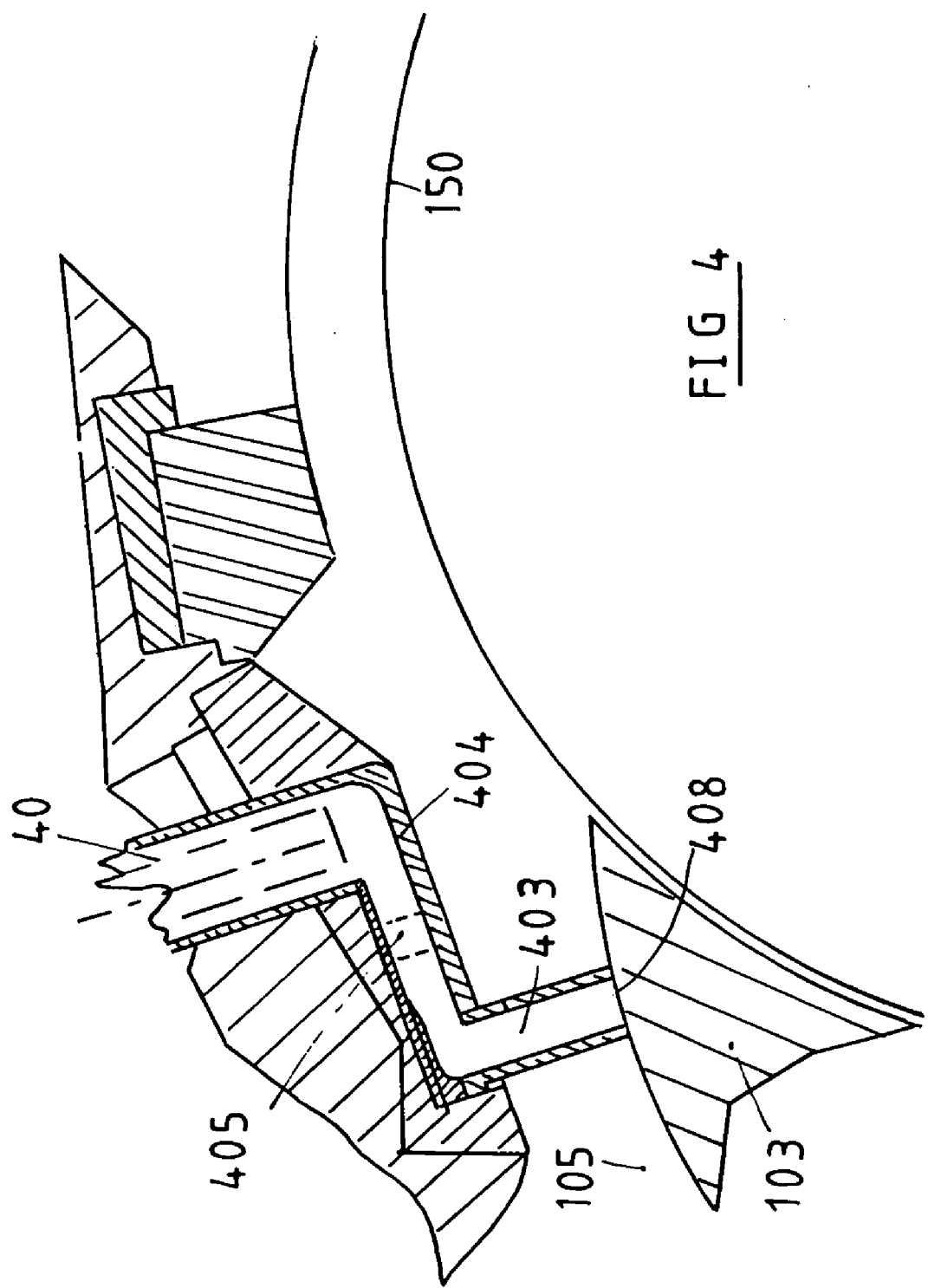
FIGS. 4 and 5 show the components of other extrusion apparatus capable of being used for forming a conductive insert.

As for the nozzle 403 shown in FIG. 4, it differs primarily from the nozzle of FIG. 3 in that the feed chamber for conductive mix is of bent shape such that the end 408 of the nozzle 403 is applied, not against the roller 15 of the extruder 10, but against the wall of the lower arch 103 of the extrusion head 102 of said main extruder 10.

Figure 5:
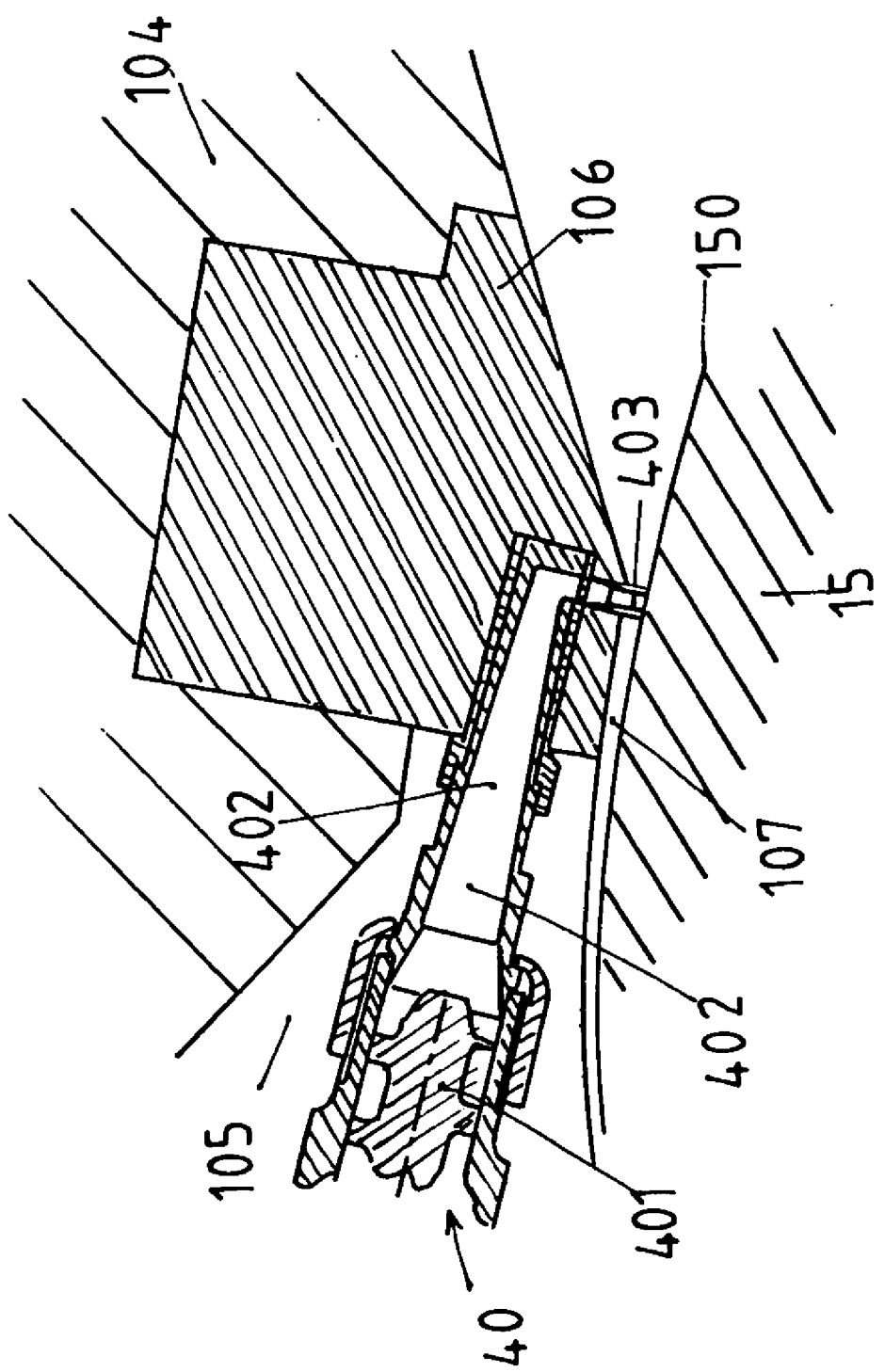

FIG. 5 shows merely the upper arch 104, the flow channel 105 bringing in the mix towards an extrusion orifice 107, defined by the cylindrical surface 150 of the roller 15 and the fixed wall of a blade 106, and thus on to said rotary roller 15, which is associated with the extruder 10, said extrusion orifice making it possible to impart the desired profile to the extruded mix. With said first extruder and roller there is associated a micro-extruder 40, mounted fixedly on the extrusion blade 106. This extruder, equipped with a screw 401 and an extrusion head 402, comprises at its end a nozzle 403 intended, depending on the desired profile and trace, to extrude the circumferential insert 12 in the profiled member of hot, non-vulcanized mix emerging from the orifice 107 of the extruder 10. The extrusion head 402 is bent at its end, so that the extrusion nozzle 403 fastened to the die of the extrusion head and placed in the extrusion orifice 107 of the main extruder can be placed against the surface 150 of the roller 15. The conductive rubber mix is thus extruded in the flow of non-conductive mix. As can easily be understood, the principle of fixing the micro-extruder to the extrusion blade of the main extruder also advantageously applies to a flat-die extruder, said extruder differing from the preceding one by the fact that there is no longer a roller, and that the extrusion orifice 107 is defined by the lower and upper walls of the extrusion blade (not shown).

FIG. 6 shows an enlarged view of an extrusion nozzle 403 having a mobile die used with the micro-extruder of FIG. 5, said die being in a position of contact with the roller of the main extruder. The extrusion blade 106 receives the nozzle 403 with mobile die, slotted along an appropriate section over part of its height, in a bore perpendicular to the extrusion head 402. The contact between the base 408 of the nozzle with mobile die 403 and the wall 150 of the roller 15 is maintained by the pressure of the conductive mix acting on the section 409, which may possibly permit extrusion of the conductive mixture discontinuously.

We claim:

1. An apparatus for making part of an electrically conductive tread having an insert of a conductive rubber mix, comprising
   a main extruder which comprises an extrusion orifice comprising a wall which cooperates with a roller and having a main extrusion head provided at its end with a main nozzle for extruding a tread comprising a non-vulcanized non-conductive mix, and
   a micro-extruder, mounted on a support and comprising an extrusion head, provided at its end with a nozzle for extruding the insert having a desire profile and trace, said nozzle being placed in the main extrusion head of the main extruder, the nozzle being placed in a space between an upper fixed part of the main extruder and a lower part of the main extruder facing said upper fixed part, and
   wherein the conductive rubber mix to be extruded flows in the flow of non-conductive rubber mix, before being extruded through the main nozzle, and
   wherein the conductive rubber mix and the non-conductive rubber mix flow in the same direction and the end of the nozzle for extruding the insert is applied against the lower part so that the extruded insert extends through the entire thickness of the extruded non-conductive rubber mix.

2. An apparatus according to claim 1, wherein, in the main extruder, the lower part of the main extruder is a lower arch upstream of the extrusion orifice of the extruder.

3. An apparatus according to claim 1, wherein the upper fixed part of the main extruder is an upper part of an extrusion blade.

4. An apparatus according to claim 1, wherein the upper fixed part of the main extruder is an upper arch of said main extruder and the lower part of the main extruder is a wall of the roller upstream of the extrusion orifice.

5. The apparatus according to claim 1,
   wherein the extrusion head comprises a die, and
   wherein the nozzle comprises an annular part and a plurality of attachment holes which makes it possible for the nozzle to bear on and be attached to the die of the extrusion head of the micro-extruder,
   wherein the nozzle further comprises a hollow cylindrical straight feed chamber having on its cylindrical surface an extrusion orifice through which the conductive rubber mix is extruded and which occupies substantially the entire height of said nozzle, and the cross-section of which is a section having two bases of different widths, the nozzle having an end or base applied tangentially against the lower part of the main extruder facing the upper part of the main extruder.

6. The apparatus according to claim 3, wherein the nozzle further comprises a mobile die, slotted over part of its height and inserted in a bore perpendicular to the extrusion head, the base of said nozzle being kept in contact with the wall of a roller by the pressure of the extruded conductive mix.

7. A tire comprising at least two layers of non-electrically conductive rubber mixes, said at least two layers including a first layer and a second layer and having a common contract wall, wherein each of said first layer and said second layer contains a circumferential insert comprising a conductive rubber mix, having, when viewed in cross-section, a surface S,
   each circumferential insert having a surface with two bases, including a first base and a second base,
   the first base of the insert of the first layer having a width E,
   the first base of the insert of the second layer having a width e'
   wherein the width E is equal to at least 10 times the width e',
   said first base of the insert of the first layer and said first base of the insert of the second layer being on the common contact wall facing each other, and the first bases having central axes which face each other, the central axes being parallel to and distant from the equatorial plane of the tire by amounts, the difference between which is at most equal to half the width E of the first base of the first layer, such that there are circumferentially between the inserts on the common contact wall a plurality of contact points providing the electrical connection between two conductive elements.

8. A tire according to claim 7, further comprising a crown reinforcement and a tread,
   wherein the crown reinforcement is radially below the tire tread, the crown reinforcement comprising calendered metal cables composed of a conductive rubber mix,
   wherein the two layers are inner and outer parts of the tread, and
   wherein the circumferential inserts of the two layers is a means for an electrical connection between the ground and the crown reinforcement.

9. A tire according to claim 7, further comprising a crown reinforcement, a carcass reinforcement and a tread,
   wherein said at least two layers comprise three layers, wherein the first layer is an inner part of the tread, the second layer is an outer part of the tread, and the third layer is a profiled element of triangular shape separating the carcass reinforcement and an edge of the crown reinforcement, wherein an electrical connection is ensured between the three layers.

10. A tire according to claim 8, wherein one of the parts of the tread is provided with an insert having a transverse surface having two bases of different width E and e, the other part being provided with an insert having a transverse surface of which is rectangular, having the two bases of said surface being equal and having width e', wherein e' is equal to e.

11. A tire according to claim 10, wherein the part provided with an insert having two bases of different widths is the outer part of the tread, the other part, provided with an insert of rectangular transverse section, is the inner part of the tread.

12. A process for obtaining assembly of two non-vulcanized layers of non-conductive mix for a tire, comprising:
   extruding each layer separately using a main extruder having an extrusion head provided with a flow channel which opens on to an extrusion orifice comprising a fixed wall which cooperates with a rotary roller, and
   inserting, by coextrusion into each layer, an insert of conductive rubber mix in a non-vulcanized state which is circumferential and has a transverse surface having two bases, using a nozzle of a micro-extruder, said nozzle being applied against the wall of the roller of the main extruder, and
   joining the two non-vulcanized layers.

13. A process according to claim 12, wherein the conductive layers are the inner and outer parts of a tire tread.

* * * * *